United States Patent
Henry

(10) Patent No.: US 11,242,109 B2
(45) Date of Patent: Feb. 8, 2022

(54) FOLDING BICYCLE

(71) Applicant: Gilles Henry, Paris (FR)

(72) Inventor: Gilles Henry, Paris (FR)

(*) Notice: Subject to any disclaimer, the term of this patent is extended or adjusted under 35 U.S.C. 154(b) by 132 days.

(21) Appl. No.: 16/614,976

(22) PCT Filed: May 18, 2018

(86) PCT No.: PCT/EP2018/063184
§ 371 (c)(1),
(2) Date: Nov. 19, 2019

(87) PCT Pub. No.: WO2018/211104
PCT Pub. Date: Nov. 22, 2018

(65) Prior Publication Data
US 2020/0198722 A1 Jun. 25, 2020

(30) Foreign Application Priority Data
May 19, 2017 (FR) ...................................... 1754460

(51) Int. Cl.
*B62K 15/00* (2006.01)
*B62K 3/04* (2006.01)

(52) U.S. Cl.
CPC .............. *B62K 15/008* (2013.01); *B62K 3/04* (2013.01)

(58) Field of Classification Search
CPC ...... B62K 3/04; B62K 15/006; B62K 15/008; B62K 19/24; B62K 19/34
USPC ................................................ 280/278, 287
See application file for complete search history.

(56) References Cited

U.S. PATENT DOCUMENTS

| | | | |
|---|---|---|---|
| 4,842,292 A * | 6/1989 | Wang ................... | B62K 15/008 280/278 |
| 4,900,047 A | 2/1990 | Montague et al. | |
| 5,069,468 A * | 12/1991 | Tsai ..................... | B62K 15/008 280/278 |

(Continued)

FOREIGN PATENT DOCUMENTS

| EP | 2409906 A2 | 1/2012 |
|---|---|---|
| EP | 2114758 B1 | 1/2013 |

(Continued)

OTHER PUBLICATIONS

International Search Report issued in International Application No. PCT/EP2018/063184, dated Jul. 30, 2018 (5 pages).

(Continued)

*Primary Examiner* — Kevin Hurley
*Assistant Examiner* — Hosam Shabara
(74) *Attorney, Agent, or Firm* — Osha Bergman Watanabe & Burton LLP

(57) ABSTRACT

Folding bicycle comprising a frame with a front frame portion on which is mounted a front wheel (1) and a rear frame portion (A) on which is mounted a rear wheel (2). The front frame portion includes an upper bar (10), a seat bar (5) and an oblique bar. The rear frame portion comprises at least one seat stay (8), at least one lower bar (9) and the seat bar (5). The oblique bar comprises an upper oblique rod (14) and a lower oblique rod (15). The lower oblique rod (15), the upper oblique rod (14), the upper bar (10) and the seat bar (5) are interconnected by joints (P1, P2, P3, P4), in this order, so as to form an articulated quadrilateral (D) deformable between a folded position and an unfolded position.

18 Claims, 8 Drawing Sheets

(56) References Cited

U.S. PATENT DOCUMENTS

| | | | | |
|---|---|---|---|---|
| 6,595,536 B1 * | 7/2003 | Tucker | ............... | B62K 15/00 |
| | | | | 280/278 |
| 10,328,992 B2 * | 6/2019 | Laxstrom | ............... | B62K 19/24 |

FOREIGN PATENT DOCUMENTS

| | | | | | |
|---|---|---|---|---|---|
| FR | 927215 A | * | 10/1947 | ......... | B62K 15/008 |
| FR | 927215 A | | 10/1947 | | |
| JP | 3100460 U | | 5/2004 | | |

OTHER PUBLICATIONS

Written Opinion issued in International Application No. PCT/EP2018/063184; dated Jul. 30, 2018 (12 pages).

English translation of Notification of Reason(s) for Refusal Issued in Japanese Application No. 2020-514343, dated Oct. 5, 2021 (5 pages).

\* cited by examiner

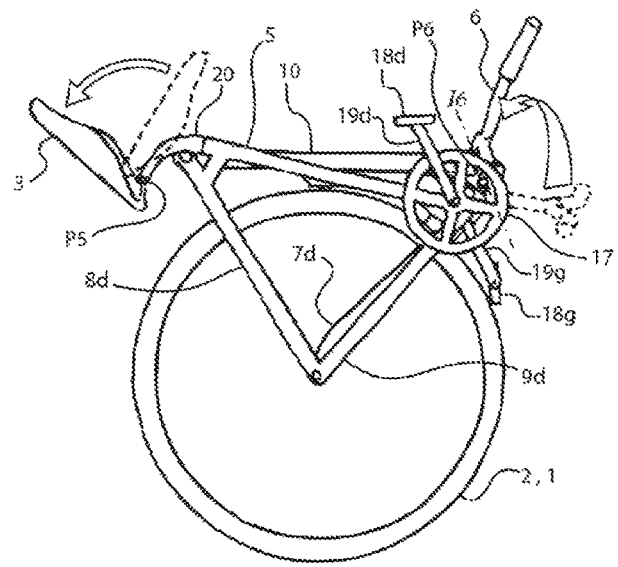
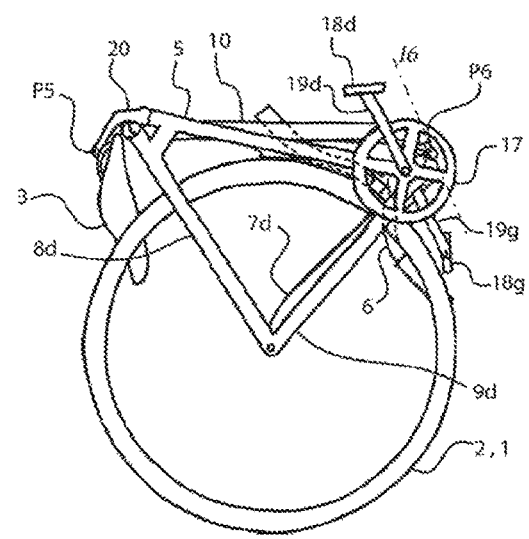
Figure 7A　　　　　　　　　　Figure 7B
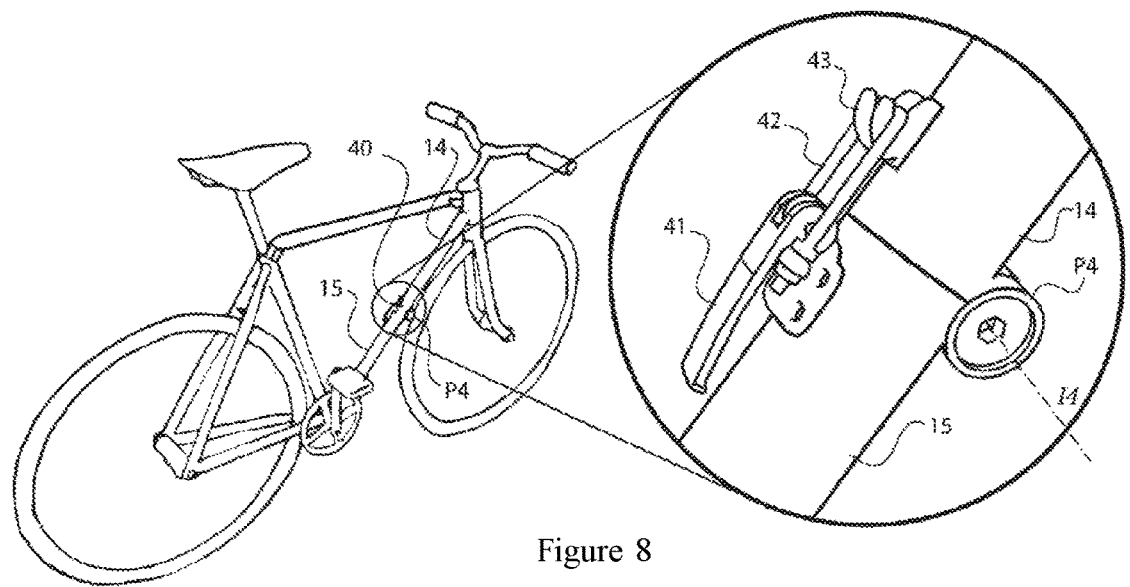
Figure 8

FOLDING BICYCLE

TECHNICAL FIELD

The present disclosure relates to a folding bicycle, that is to say a bicycle deformable between an unfolded position in which the bicycle is used as a means of transport and a folded position in which the bicycle size is reduced. Once folded, the bicycle can then be stored or transported more easily.

BACKGROUND

There are already many types of folding bicycles. However, most of these bicycles have small wheels, to reduce their size when folded. This has the disadvantage of reducing the comfort and stability of the bicycle when in use.

There are however a few folding bicycles of normal size; by that, we mean bicycles having wheels with a diameter proportionate to the size of the bicycle user. Typically, by today's standards, the diameter of a wheel (more specifically of a tire) recommended for an average adult is between 650 and 700 mm, i.e. between 26 and 28 inches. However, most of these bicycles are actually more dismountable than foldable because their folding requires disassembling all or part of the frame and/or removing one or more wheels. This is the case, for example, of the folding bicycle of patent document U.S. Pat. No. 4,900,047 or patent document EP 211475861.

These bicycles are not satisfactory because the operations required for folding them are complex and their frame may lack rigidity when assembled.

There is therefore a need for a new type of folding bicycle, of normal size, where folding and unfolding operations are simple and do not need to disassemble part of the frame or the wheels of the bicycle.

GENERAL PRESENTATION

The invention relates to a folding bicycle comprising a front wheel, a rear wheel and a frame. The frame includes a front frame portion on which the front wheel is mounted, via a pivoting fork, and a rear frame portion on which the rear wheel is mounted. The front frame portion includes an upper bar, a seat bar and an oblique bar. The seat bar is also part of the rear frame portion. The rear frame portion may include at least one seat stay, at least one lower bar and the seat bar.

According to a first embodiment, the oblique bar includes an upper oblique rod and a lower oblique rod. The lower oblique rod, the upper oblique rod, the upper bar and the seat bar are connected together by joints, in this order, so as to form an articulated quadrilateral deformable between a folded position and an unfolded position. The deformable articulated quadrilateral is configured in such a way that, when deforming towards its folded position, the bicycle folds in the longitudinal direction, the front and rear wheels move transversely away from each other while moving towards each other in the longitudinal direction until the front wheel comes to overlap with the rear wheel in a transverse direction of the bicycle.

According to a second embodiment, the front frame portion includes an upper bar, a portion of the seat bar, a connecting bar and an oblique bar. The upper bar, the portion of the seat bar, the connecting bar and the oblique bar are interconnected in this order, by joints so as to form an articulated quadrilateral deformable between a folded position and an unfolded position. The deformable articulated quadrilateral is configured in such a way that, when deforming towards its folded position, the bicycle folds in the longitudinal direction, the front and rear wheels move transversely away from each other while moving towards each other in the longitudinal direction until the front wheel comes to overlap with the rear wheel in a transverse direction of the bicycle.

Thus when the bicycle is in the folded position, the front wheel is superimposed on the rear wheel in a transverse direction of the bicycle. In other words, the front wheel and the rear wheel are substantially arranged one opposite the other in the transverse direction of the bicycle, it being understood that these wheels can be slightly offset with respect to one another in a direction perpendicular to the transverse direction, without departing from the scope of the invention.

In the present disclosure, the length of the bicycle is measured between the front end of the front wheel and the rear end of the rear wheel of the bicycle. The longitudinal direction of the bicycle is the direction of the bicycle length. The longitudinal direction corresponds to the front-rear direction of the bicycle when it is in the unfolded position, the front and rear being defined with respect to the normal direction of the bicycle movement when the latter is used as a means of transport.

The bicycle height is considered along the vertical direction when the bicycle is on wheels, in the unfolded position, on a horizontal surface.

The "median plane" of the bicycle corresponds to the median plane of the rear wheel of the bicycle. When the bicycle is unfolded, and its front and rear wheels are aligned, the front and rear wheels are in the median plane and the longitudinal axis of the bicycle is contained in this plane.

The transverse direction is the direction perpendicular to the median plane of the bicycle.

The fact that the front and rear wheels are superimposed in the folded position along the transverse direction allows the size of the bicycle in the folded position to be limited while having wheels of normal size, i.e. with a diameter proportionate to the size of the bicycle user. Thus, the comfort and stability of the bicycle when used in the unfolded position are preserved and, when folded, the bicycle can be easily stored (e.g. in an apartment, a basement, on a balcony, etc.) and easily transported (e.g. in a car trunk, in public transport, etc.).

In addition, the deformation of the articulated quadrilateral being possible without having to dismantle part of the frame or a bicycle wheel, the bicycle can be folded simply and quickly.

Said articulated quadrilateral is defined by said four joints that form the four corners of the quadrilateral. The four sides of the quadrilateral are, in turn, formed by the elements which connect the joints together. In the first embodiment aforementioned, the four sides are formed essentially by the lower oblique rod, the upper oblique rod, the upper bar and the seat bar, respectively. Similarly, in the second embodiment mentioned above, the four sides are formed essentially by the upper bar, the upper portion of the seat bar, the connecting bar and the oblique bar. The aforementioned rods and bars are generally substantially straight, but they are not necessarily so. The notion of quadrilateral should therefore, in this respect, not be interpreted strictly. For example, these bars and rods may be curved or have a broken line shape without departing from the scope of the invention.

In some embodiments, the joints are revolute joints or screw joints. These joints are structurally simple and allow the four sides of the deformable articulated quadrilateral to be guided in rotation by permitting only one rotation about the axis of the joint. Folding the bicycle is facilitated by such a guiding. The bicycle can thus be folded in a smooth, fast and intuitive way.

In some embodiments, the joints are revolute joints and axes of these joints intersect at a same point.

In other embodiments, the axes of the joints are parallel between themselves. In this case, the axes of the joints are preferably inclined at the same angle from the transverse direction of the bicycle. The axes of bonds may be horizontal when the bicycle is folded and resting on a horizontal surface.

In some embodiments, the rear frame portion is non-deformable. This improves the stability of the bicycle when in use.

In some embodiments, the bicycle includes a locking system to lock the articulated quadrilateral in its unfolded position. Depending on the configuration adopted for the articulated quadrilateral, a locking system may be provided between the lower oblique rod and the upper oblique rod, or between the portion of the seat bar and the connecting bar.

The locking system may include, for example, a clip or a clamping collar held by a screw, or a hook system actuated by a lever. In some embodiments, the locking system includes a bolt slidably mounted inside on the oblique rods, between an extended position and a retracted position, and a keeper fitted inside the other oblique rod and cooperating with the bolt in the extended position to prevent relative rotation of the oblique rods around the joint.

In some embodiments, one of the oblique rods has an extension extending axially beyond the joint, while the other rod has a cut-out whose shape is complementary to that of the extension, and the bolt axially slides inside the extension. This configuration ensures a better lock for the articulated quadrilateral in its unfolded position.

In some embodiments, the locking device includes an unlocking lever mounted on the same oblique rod as the bolt and cooperating with the bolt to drive the latter towards its retracted position and thus allow rotation of the oblique rods relative to each other.

In some embodiments, the locking system includes a latch movably mounted in said extension, between a locking position of the bolt and a bolt release position. With reference to the central axis of the oblique rod, the latch can be moved in translation laterally but not axially. A pin is provided facing the latch, on a side face of the cut-out, so that the pin comes to bear on the latch to unlock the bolt when the oblique rods are unfolded to be aligned. Such a configuration allows to easily and quickly unlock the bolt, thereby locking the articulated quadrilateral, when unfolding the bicycle.

In some embodiments, the bicycle includes a locking system for locking the bicycle chain set in a particular position when folding or unfolding the bicycle. In particular, the chain set may include a pedal plate rotating about an axis and the locking system may include a pin fixed on the lower oblique rod close to the plate; and a stop fixed on the inner face of the plate. In the unfolded position, the pin does not interfere with the stop travel and the plate is thus free to rotate around its axis. During folding, when the lower oblique rod pivots with respect to the seat bar and approaches it, the pin approaches the axis of the plate and cuts the stop travel. The plate can then no longer rotate freely.

The above features and advantages, as well as others, will emerge from reading the following detailed description of examples of the proposed folding bicycle. This detailed description refers to the accompanying drawings.

BRIEF DESCRIPTION OF DRAWINGS

The accompanying drawings are diagrammatic and not to scale, they are primarily intended to illustrate the principles of the invention.

In these drawings, from one figure (FIG) to another, the identical elements (or element parts) are denoted by the same reference signs.

FIGS. 7A and 7B show, in side view, a bicycle in a folded position similar to those of FIGS. 4C and 6D.

FIG. 8 shows an example of a locking system for locking a bicycle in its unfolded position.

DETAILED DESCRIPTION OF EXAMPLES

Examples are described in detail below with reference to the accompanying drawings. These examples illustrate the features and advantages of the invention. However, the invention is not limited to these examples.

In this application, unless otherwise specified, the horizontal and vertical directions are considered in reference to the unfolded position of the bicycle when it rests, under normal conditions of use, on a horizontal surface. The top and bottom are defined in the vertical direction. The front and rear, right and left, are defined relative to the normal direction of the bicycle ride.

Figure 1:
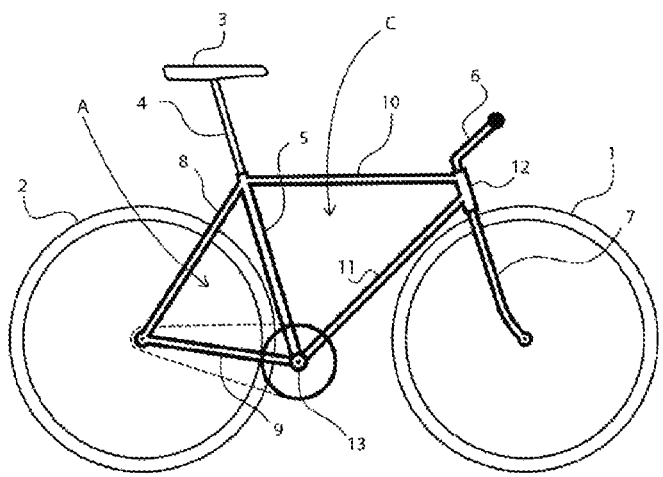
FIG. 1 is a diagrammatic side view of a conventional bicycle according to the prior art.

FIG. 1 shows a conventional full-size bicycle for adult, seen in profile. Such a bicycle has:
- a front wheel 1 and a rear wheel 2;
- a seat 3 mounted on a seat rod 4, which is itself mounted on a seat bar 5;
- a fork 7 pivotally mounted on the bicycle frame and to which is attached the front wheel 1, and
- handlebars 6 connected to the fork 7 and for turning the fork.

The seat bar 5 is typically a tube within which the seat rod 4 is slidably mounted so that the seat 3 can be adjusted in height.

In addition, the bicycle includes a frame with a rear frame portion A (sometimes called the rear triangle) and a front frame portion C (sometimes called front triangle or central triangle).

The rear frame portion A is formed by the seat bar 5, at least one seat stay 8 and at least one lower bar 9 (sometimes called chain bar). In general, except for the bicycle models called "single-arm", the seat stay 8 and the lower bar 9 are doubled (i.e. there are two seat stays and two lower bars) and located on either side of the rear wheel 2. In this case, the left and right seat stays are respectively noted 8g and 8d, and the left and right lower bars are respectively noted 9g and 9d.

Similarly, the fork 7, if it is not single-arm, has a left fork leg 7g and a right fork leg 7d.

The front frame portion C is formed by the seat bar 5, an upper bar 10 (sometimes referred to as horizontal bar) and an oblique bar 11. A head tube 12 is secured on the front frame portion C, at the front corner of this part. The fork 7 and the handlebars 6 pivot within the head tube.

Furthermore, the bicycle 1 of FIG. 1 is equipped with a chain set (not shown) which is fixed on a bottom bracket 13 whose axis is located at the intersection of the seat bar 5, the oblique bar 11 and the lower bar(s) 9.

Figure 2A:
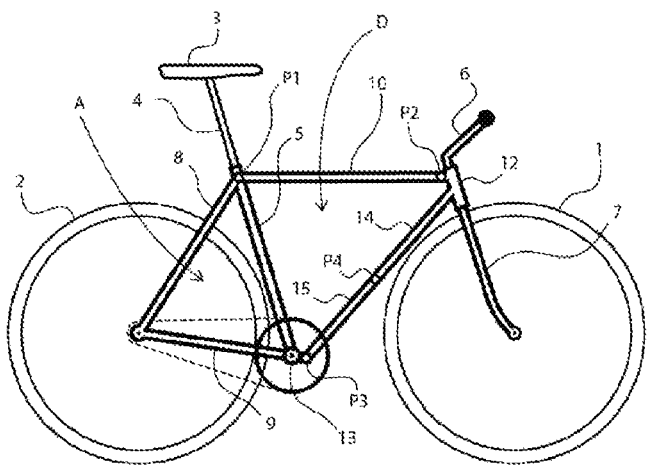
FIGS. 2A to 2C are diagrammatic profile views of the folding sequence of a first example of a bicycle according to the invention.

FIG. 2A shows an example of a folding bicycle according to the invention in the unfolded position, seen in profile.

On this bicycle, in contrast with the bicycle of FIG. 1, the front frame portion is formed by a deformable articulated quadrilateral D, defined by the joints P1, P2, P3 and P4. The four sides or segments of the articulated quadrilateral D are essentially formed by the following elements:

the seat bar 5, which connects the joints P1 and P3;
the horizontal bar 10 which connects the joints P1 and P2;
an upper oblique rod 14 which connects the joints P2 and P4; and
a lower oblique rod 15 which connects the joints P3 and P4.

On this bicycle, in contrast with the bicycle of FIG. 1, the oblique bar is formed in two parts hinged together by the joint P4: the upper oblique rod 14 and the lower oblique rod 15.

Bars and rods 5, 10, 14, 15 which form the four sides of the articulated quadrilateral D are rigid.

In the example shown, the head tube 12 is an integral part of the upper oblique rod 14 and forms the upper end thereof. The joint P2 connects this head tube 12 to the horizontal bar 10. The head tube 12 could however be connected differently to the upper oblique rod 14 or the horizontal bar 10. For example, the head tube may be an integral part of the horizontal bar 10 and form the front end thereof. In this case, the joint P2 can connect the head tube 12 to the upper oblique rod 14.

The joint P3 is located near the axis of the bottom bracket 13 but is not necessarily positioned on this axis.

The bicycle frame of FIG. 2 thus includes a front frame portion on which the front wheel 1 is mounted through the pivoting fork 7, and a rear frame portion A on which the rear wheel 2 is mounted.

The front frame portion forming the articulated quadrilateral D includes the upper rod 10, the seat bar 5 and the oblique bar formed by the lower oblique rod 15 and the upper oblique rod 14. The rear frame portion A includes the seat stay(s) 8, the lower bar(s) 9 and the seat bar 5.

In its unfolded position shown in FIG. 2A, the articulated quadrilateral D has a shape close to that of a triangle. The upper oblique rod 14 and the lower oblique rod 15 are substantially aligned and together form one side of said triangle.

A deformable articulated quadrilateral connected by joints with only one degree of freedom in rotation (a rotation alone or a rotation combined with a translation) offers the advantage of easy folding and unfolding without having to disconnect one of its elements.

Furthermore, it is sufficient to block one of the joints to make the quadrilateral impossible to deform. Also, a locking system is provided for locking one of the joints and locking the articulated quadrilateral in its unfolded position. Thus, in the unfolded position, once the front frame portion is locked, the bicycle has a rigidity substantially equivalent to that of a conventional bicycle like the one of FIG. 1.

An example of a locking system 40 is shown in FIG. 8. This system includes an eccentric lever 41 fixed to the lower oblique rod 15, a ring 42 passed around the lever 41 and a hook 43 attached to the upper oblique tube 14. The hook 43, the ring 42 and the lever 41 cooperate so that, when the ring 42 is hooked on the hook 43, pivoting the lever 41 sets the ring 42 under tension. In this example, the joint P4, which connects together the upper and lower oblique rods 14, 15, is located on one side of the rods 14, 15 when they are aligned. The pivot axis 14 of the joint is oriented perpendicularly and offset from the central axis of the rods 14 and 15. The locking system is located on the opposite side to the joint P4 with respect to the central axis of the rods 14 and 15. When this system is locked by tensioning the ring 42, it prevents relative movement between the rods 14, 15 and the joint P4 is blocked; the rods 14, 15 are maintained aligned with each other, as shown in FIG. 8. Of course, this is just an example of a locking system and other systems could be used.

FIGS. 10A to 10C and 11 show another example of a locking system located at the joint P4 that connects together the upper and lower oblique rods 14, 15. As in the example of FIG. 8, the P4 joint is located on a side of the rods 14, 15 when they are aligned. In other words, the joint P4 is laterally offset relative to the central axis of the rods, when the bicycle is unfolded. In the present description of the locking system, "axial" or "axially" refer to a direction parallel to the central axis of the rods 14, 15, when the bicycle is unfolded, and "lateral" or "laterally" refers to a direction perpendicular to the axial direction.

Figure 10A:
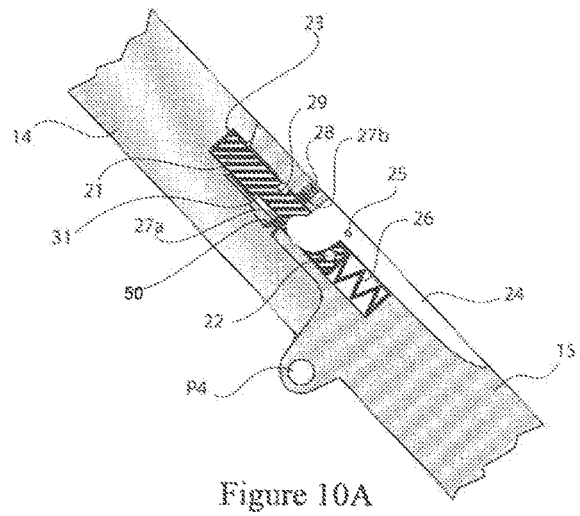
FIGS. 10A to 10C show a second example of a locking system for locking a bicycle in its unfolded position.
Figure 10B:
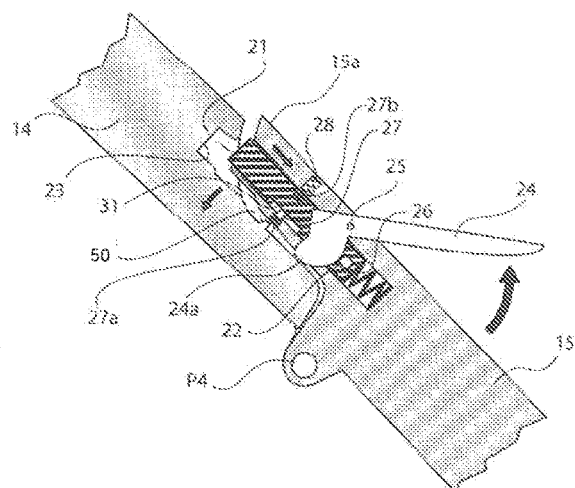
Figure 10C:
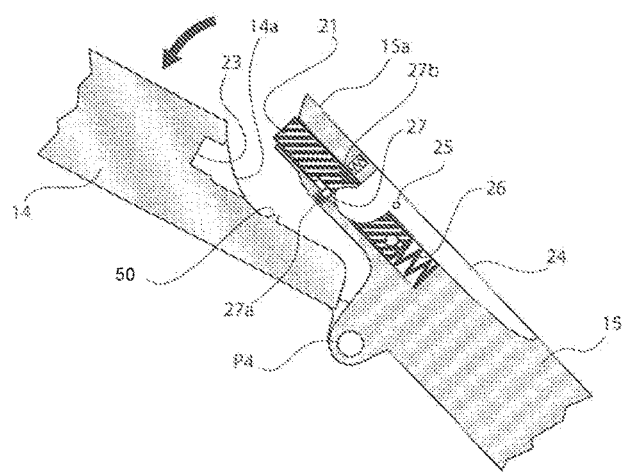
Figure 11:
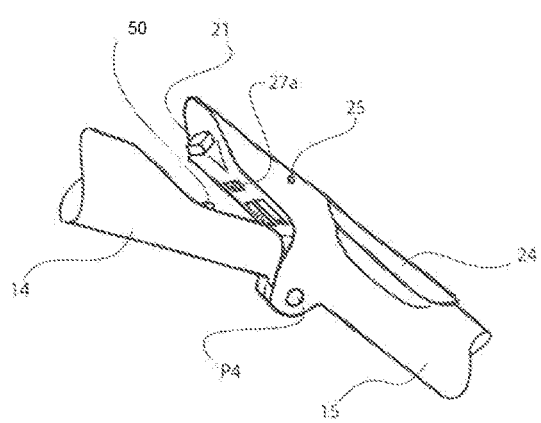
FIG. 11 is a perspective view of this second example of a locking system in its unlocked position.

Referring to FIGS. 10 and 11, the locking system includes:

a bolt 21 slidably mounted within the lower oblique rod 15, between an extended position and a retracted position;
a keeper 23, fitted inside the upper oblique rod 14 and cooperating with the bolt 21 in the extended position to block the joint P4, i.e. to prevent a relative rotation of the oblique rods 14 and 15 around the joint P4; and
an unlocking lever 24 mounted on the lower oblique rod 15 and cooperating with the bolt 21 to drive the latter towards its retracted position and unlock the joint P4, and thus allow rotation of the oblique rods one relative to the other.

One of the rods, in the example the rod 15, has an extension 15a extending axially beyond the joint P4, while the other rod 14 has a cut-out 14a whose shape is complementary to that of extension 15a. When the bicycle is unfolding, the extension 15a is received in the cut-out 14a. The bolt 21 is housed at least partially in the extension 15a and slides axially within the latter, while the keeper 23 is provided at the cut-out 14a. In the extended position, the bolt 21 protrudes at the free end of the extension 15a. Thus, the bolt engagement area 21 in the keeper 23 is offset axially with respect to the joint P4. Such a configuration provides a better lock.

In the extended position, the bolt 21 is engaged or pushed into the keeper 23 (see FIG. 10A). A compression spring 26 may act on the bolt 21 to hold it in this retracted position.

A latch 27 may be mounted in the lower oblique rod 15 for retaining the bolt 21 in its retracted position (see FIGS. 10B, 10C). In the example of the figures, the latch 27 at least partially surrounds the bolt 21 so that a first end 27a of the latch is located on one side of the bolt 21 and the opposite end of the latch, or second end 27b, is located on the other side of the bolt 21. The latch 27 is mounted inside the extension 15a of the rod 15 and is movable in translation in a lateral direction. However, the latch 27 is not axially movable. A notch 29 is formed in a side face of the bolt 21 in order to receive the second end 27b of latch 27. In the locking position, the second end 27b of the latch is engaged in the notch 29 so as to lock the bolt 21 in its retracted position, as shown in FIG. 10C. To do this, a compression spring 28 pushes the latch 27 toward the bolt 21, into the notch 29. Conversely, in the release position, the latch 27 is no longer engaged in the notch 29, as shown in FIG. 10A.

A groove 31 may be formed in the side face of the bolt 21 facing away from the notch 29 in order to receive the first end 27a of the latch. In the release position, the first end 27a of the latch is engaged in the groove 31, as shown in FIG. 10A, and this end 27a slides axially in the groove 31 when the bolt 21 slides. The end 27a comes out of the groove 31 when the second end 27b enters the notch 29, and vice versa. In addition, a pin 50 may be provided, opposite the first end 27a on the side face of the cut-out 14a of the upper oblique rod 14, so that the pin 50 presses against the end 27a to make it penetrate into the groove 31, and to cause the second end 27b to come out of the notch 29, thus releasing the bolt 21, when the bicycle is unfolded.

The lever 24 is pivotally mounted on the lower oblique rod 15 around an axis 25 and cooperates with a stop 22 of the bolt 21. The lever 24 can act against the return force exerted by the spring 26 on the bolt 21. To unlock (FIG. 10B), the user lifts the lever 24 which acts on the stop 22 for sliding the bolt 21 to its retracted position and compressing the spring 26 until the second end 27b of the latch 27, under the effect of the spring 28, enters the notch 29. At this stage, the bolt 21 is disengaged from the keeper 23 and held in this retracted position by the latch 27.

The lever 24 also includes one or more pushers 24a. When unlocking, when the lever 24 is raised, the one or more pushers 24a push against the upper oblique rod 14, causing it to deviate from the lower oblique rod 15 by pivoting about the joint P4. Thus, when the lever 24 is lifted and simultaneously with the bolt 21 sliding movement, the pin 50 ceases to press the first end 27a of the latch 27, which makes possible the lateral displacement of the latch 27 and allows the second end 27b to engage in the notch 29. The latch 27 then holds the bolt 21 in its retracted position.

To continue folding the bicycle (FIG. 10C), the user may release the lever 24 and rotate the oblique rods 14 and 15 relative to each other around the joint P4. A biasing means (not shown) may be provided to allow the lever 24 to return against the lower oblique rod 15, as shown in FIG. 10A or 10C.

Conversely, when the bicycle is unfolded, when the oblique rods 14 and 15 pivot relative to each other and reach the relative position shown in FIG. 10B, the pin 50 presses against the first end 27a of the latch. It then pushes the latch 27, acting against the return force of the spring 28, which brings the second end 27b out of the notch 29 and releases the bolt 21. Under the effect of the spring 26, the bolt 21 springs out to its extended position and can engage again into the keeper 23. The bicycle is thus locked in the unfolded position (FIG. 10A).

FIG. 11 is a view in perspective of the unlocking system described above, in a position identical to that of FIG. 10C. Thanks to such an unlocking system, the bicycle has a simple mechanism for an easy unlocking of the bicycle, and for an automatic locking when unfolding.

Of course, the shapes of the rods 14 and 15 could be reversed, i.e. the bolt 21 could be mounted on the upper oblique rod 14 and the keeper 23 be provided in the lower oblique rod 15.

Figure 2B:
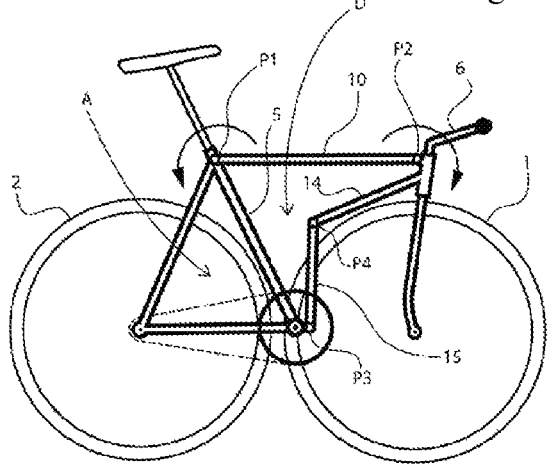

To initiate the folding of the bicycle of FIG. 2, once the the articulated quadrilateral D is unlocked, it is sufficient to tilt the rear portion of the bicycle (including, in particular, the rear frame portion A and the rear wheel 2) toward the front, by pivoting it around the joint P1, while tilting the front part of the bicycle (including, in particular, the front frame portion and the front wheel 1) to the rear, as illustrated by the arched arrows in FIG. 2B. The articulated quadrilateral D then takes a shape of an arrowhead, as shown in FIG. 2B.

In the folded position (FIG. 2C), the articulated quadrilateral D reaches an almost flat shape, allowing all its constitutive elements to fold in a small space, close to the wheels, in order to minimize the size of the folded bicycle.

Figure 2C:
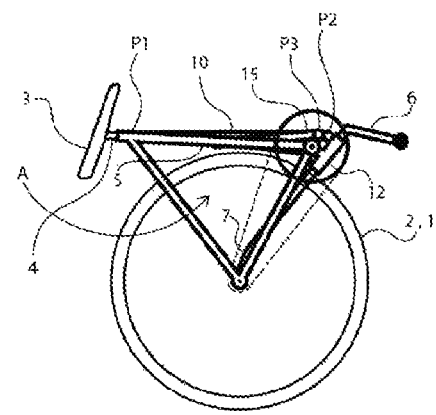

As shown in FIG. 2C, the respective positions of the joints P1 P2, P3 and P4 and the dimensions of the bars and rods 5, 10, 14, 15 are adapted so that, in this folded position, the front wheel 1 and the wheel back 2 overlap in the transverse direction of the bicycle. This configuration enables to minimize the size of the folded bicycle. This also allows the user to drag the folded bicycle on its wheels and, thus, to move with the folded bicycle without having to carry it. To facilitate this use, another locking system may be provided to lock the bicycle in its folded position. The seat 3 may also be retracted in the folded position, by sliding the seat rod 4 inside the seat bar 5 to the lowest position (FIG. 2C).

Thus, there is provided a full-size bicycle with a simple and reliable folding that does not require disassembling a part of the frame or a wheel, the bicycle having a rigid structure in its unfolded position and a compact size in its folded position.

It is to be noted, however, that the folding described with reference to FIGS. 2A-2C would not be possible if the joints P1, P2, P3 P4 were revolute joints located in the same plane, with axes perpendicular to the median plane of the bicycle. Indeed, in this case, the front and back wheels 1, 2, which are aligned in the unfolded position, would come in contact with each other and with some structural elements (in particular, the front wheel 1 would abut against the lower oblique rod 15) at the time of folding.

It is therefore necessary to provide a special configuration for the joints P1, P2, P3 and P4 in order to allow, during folding, the front wheel 1 to shift toward the side (i.e. transversally) relative to the rear wheel 2.

According to a possible configuration, the joints P1, P2, P3 and P4 are screw joints, that is to say joints offering a mobility according to combined rotational and translational movements, whose axes are perpendicular to the median plane of the bicycle, and whose direction of rotation and thread pitch are calculated so that, upon folding, the plane of the front frame and front wheel 1 move away transversely from that of the rear frame portion A and rear wheel 2. Other possible configurations, using more simple structure of the joints and generally more robust than screw joints, are described with reference to FIGS. 3 to 9D.

Figure 3:
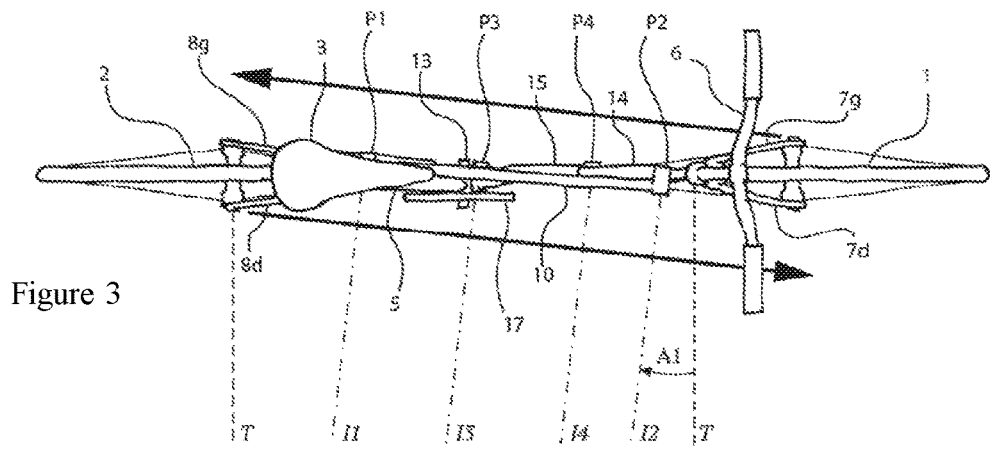
FIG. 3 is a top view of another example of a bicycle according to the invention.

FIG. 3 depicts another example of a bicycle, seen from above.

In this embodiment, the joints P1, P2, P3 and P4 are revolute joints whose axes, respectively denominated I1, I2, I3 and I4, are parallel and inclined at the same angle A1 with respect to the transverse direction T of the bicycle.

In the example shown, the axes I1, I2, I3 and I4 are inclined at an angle A1 in the clockwise direction (in top view) or rearward on the right side of the bicycle.

This configuration allows, when folded, if one considers the upper bar 10 as fixed, to rotate the front of the bicycle, in particular the front wheel 1, backwards around the joint P2 by deviating transversely from the upper rod 10, on the left in FIG. 3. In contrast, the rear part of the bicycle, in particular the rear wheel 2, rotates forward around the joint P1 by deviating transversely from the upper rod 10, on the right in FIG. 3. The front and rear wheels of the bicycle will thus move transversely away from each other while coming longitudinally closer to each other.

It is to be noted that the bicycle is equipped, in addition to a bottom bracket 13, with a pedal plate 17 located generally on the right of the bicycle.

In addition, in this example, the head tube 12 is connected fixedly to the upper oblique rod 14, through an arm 16 allowing the head tube 12 to be shifted to the front direction relative to the upper oblique rod 14. The head tube 12 could however be connected differently to the upper oblique rod 14 or the horizontal bar 10 without this affecting the folding or the proper operation of the bicycle.

Figure 4A:
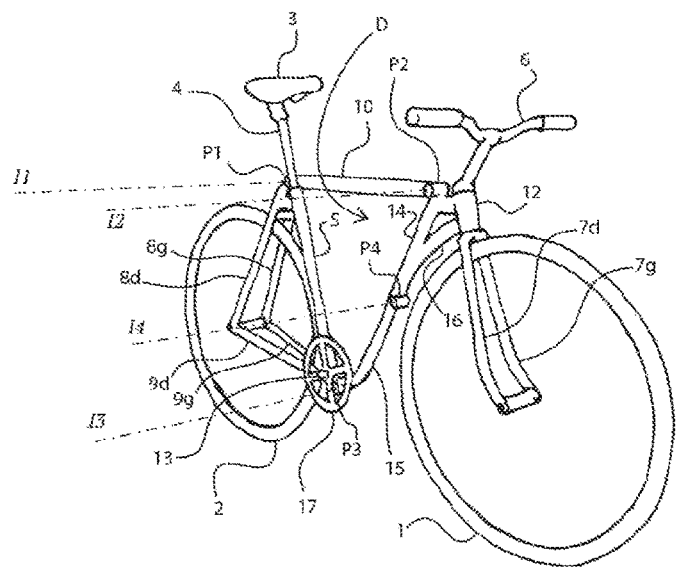
FIGS. 4A to 4C illustrate, in perspective, the folding sequence of the bicycle of FIG. 3.
Figure 4B:
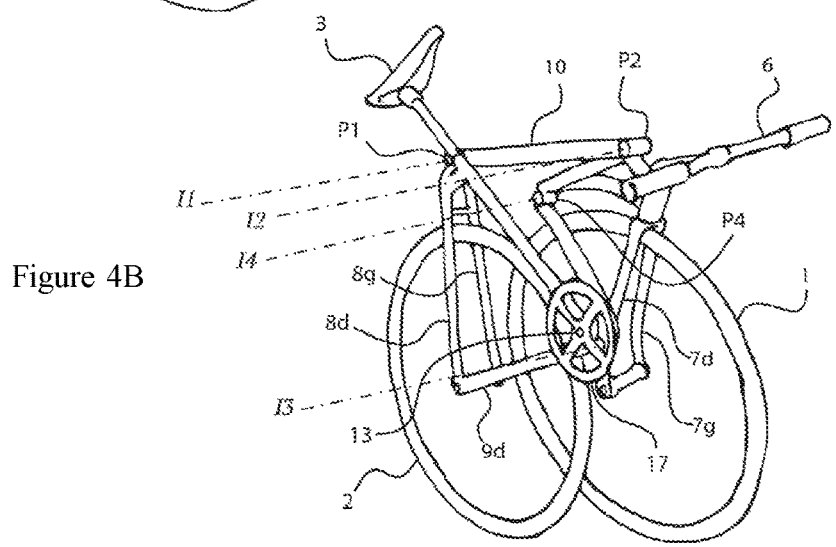
Figure 4C:
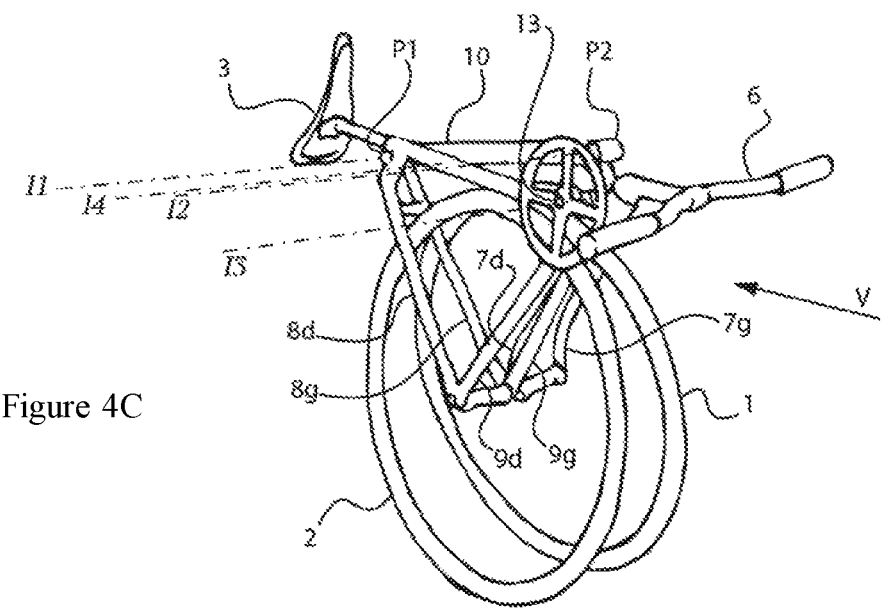

FIGS. 4A-4C illustrate in perspective the folding sequence of the bicycle according to this example.

During folding (FIG. 4B), if the angle A1 is large enough, the front wheel 1 and the right fork leg 7d avoid touching other parts of the bicycle and, in particular, in this example, the rear wheel 2, the bottom bracket 13, the joint P3, the left chain bar 9g and the plate 17 which is located on the right side.

Similarly, the lower oblique rod 15, by pivoting about the joint P4, passes on the right of the front wheel 1, and by pivoting about the joint P3, passes on the left of the seat bar 5.

In the folded position (FIG. 4C), the front wheel 1 and the rear wheel 2 are in vis-à-vis in the transverse direction. The right fork leg 7d and the left chain bar 9g are next to each other.

Figure 5:
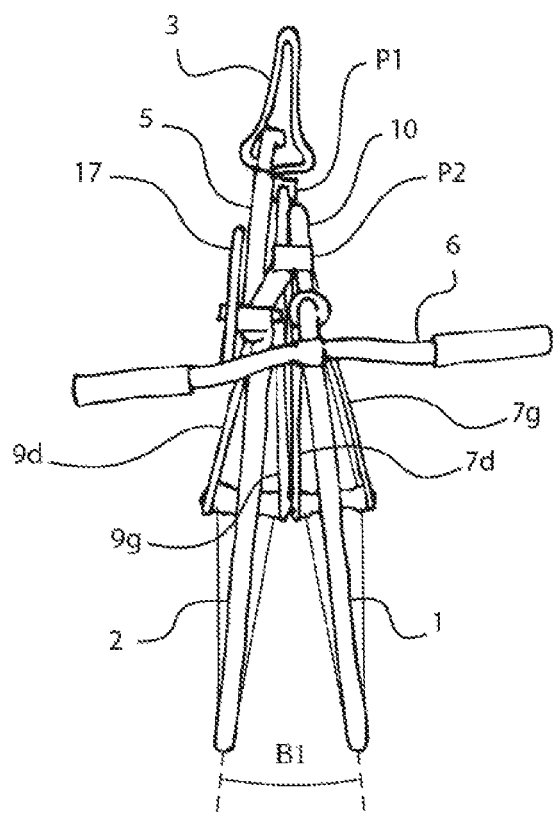
FIG. 5 shows the bicycle of FIG. 3 in its folded position, in front view according to arrow V of FIG. 4C.

As illustrated in FIG. 5, after having rotated and given the arrangement of the P2 and P4 joints, the front wheels 1 and rear 2 are not parallel in the folded position, but inclined with respect to one another according to an angle B1 which depends on the value of the angle A1.

The angle A1 may thus be adjusted to allow unhindered folding (FIG. 4B), while optimizing the final gap between the wheels (FIGS. 4C and 5).

In FIGS. 4A-4C, the bicycle chain set is not complete in the sense that the pedals are not represented. The presence of the pedals and, in the example, the left pedal, can however be taken into account to adjust the angle A1. In a variant, the pedal in question can be placed in a particular position prior to folding the bicycle to interfere as little as possible with the travel of the front wheel 1 and of the right fork leg 7d. In another variant, the pedal in question may be removed. The latter variant, although acceptable, is not fully satisfactory because it requires additional manipulations when folding the bicycle.

FIGS. 6A to 6D are perspective view of another example of the bicycle.

This example differs from that of FIGS. 4A to 5 in that the axes I1, I2, I3, I4 of joints P1, P2, P3 and P4 are not parallel but intersecting. They converge at a point S which is located in a different plane and transversely away from the median plane of the bicycle.

Figure 6A:
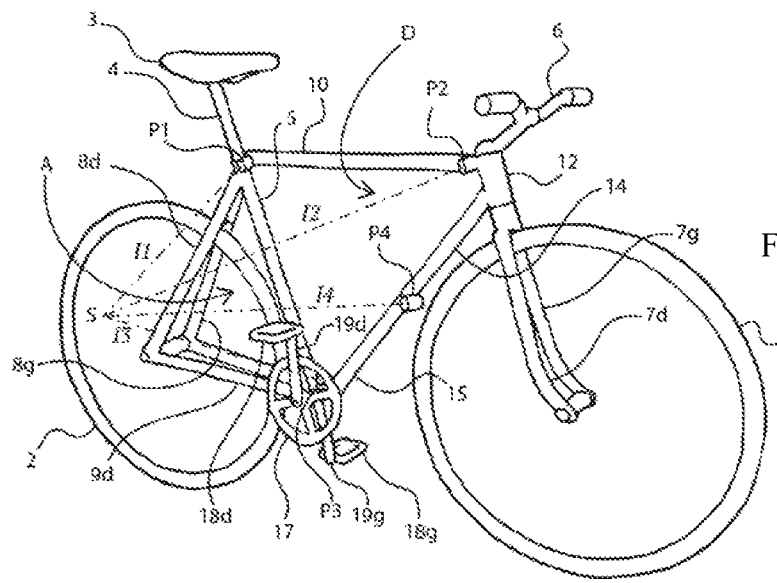
FIGS. 6A to 6D are perspective views of the folding sequence of another example of a folding bicycle according to the invention.
Figure 6B:
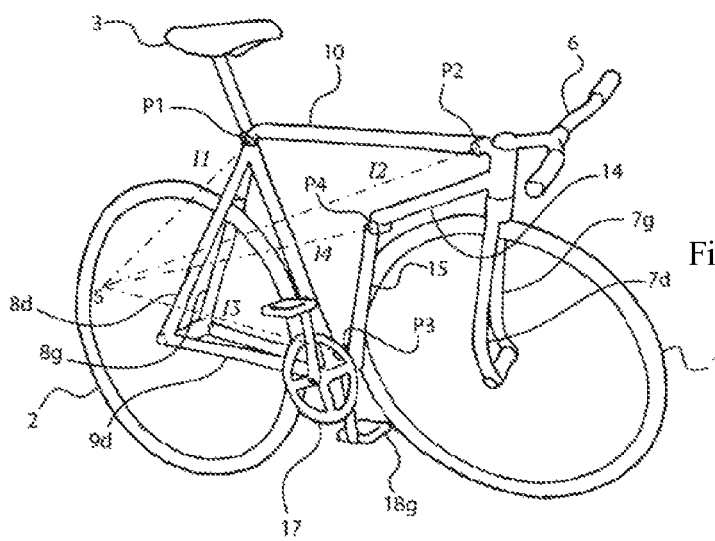
Figure 6C:
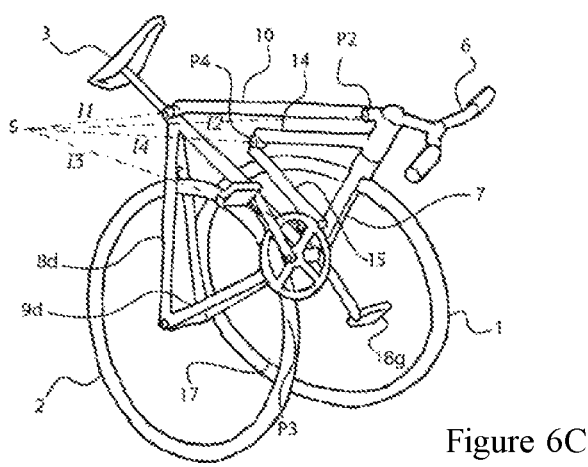

In the example of FIG. 6A and following, the point S is placed on the right of the bicycle but it could also be placed on the left.

Such a configuration allows the deformable quadrilateral D to fold as easily as in the other examples and, when point S is sufficiently spaced transversely from the median plane of the bicycle, the assembly has a sufficient rigidity in the unfolded position, once one of the joints (e.g. the joint P4) is locked in rotation by a locking device (not shown). Indeed, the volume formed by the joints P1, P2, P3, P4 and the point S is then a stable pyramid.

For this embodiment, the complete bicycle chain set is shown in the figures, comprising:
  a left pedal 18g pivotally mounted on a left crank arm 19g which is itself fixed to the bottom bracket 13;
  a right pedal 18d pivotally mounted on a right crank arm 19d which is also fixed to the bottom bracket 13.

FIGS. 6A to 6D illustrate the complete folding procedure of the bicycle.

At the beginning of folding (FIG. 6B), thanks to the angle between the axes I1, I2, I3 and I4, the front wheel 1 pivots to the rear and simultaneously move away towards the left of the bicycle. The edge of the front wheel 1 thus avoids touching the left pedal 18g or the lower oblique rod 15.

When the bicycle folding continues (FIGS. 6C and 6D), the front wheel 1 and the right fork leg 7d skirt the left pedal 18g and the left crank arm 19g.

In the folded position, the front wheel 1 comes close to and vis-à-vis the rear wheel 2 in the transverse direction, thus giving the bicycle a configuration and a volume similar to that of the embodiment of FIG. 4C. This solution has the advantage of not having to position the pedals at a particular position or to dismantle the chain set prior to folding.

Figure 12A:
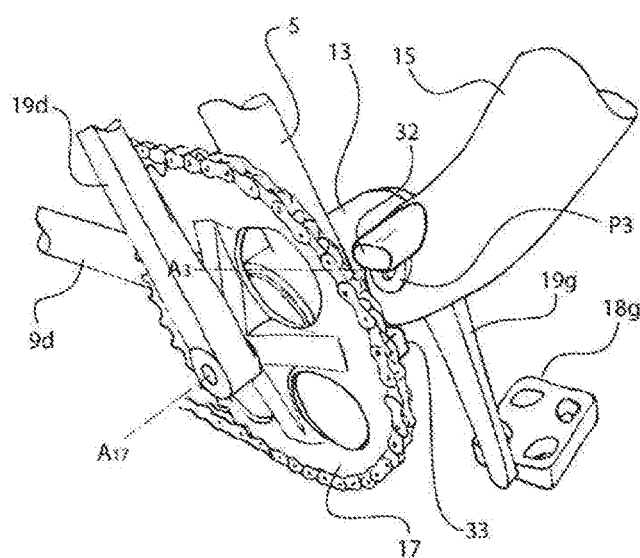
FIGS. 12A and 12B are perspective views of a chain set of a folding bicycle with a chain set locking system, when the bicycle is in the unfolded and folded position, respectively.
Figure 12B:
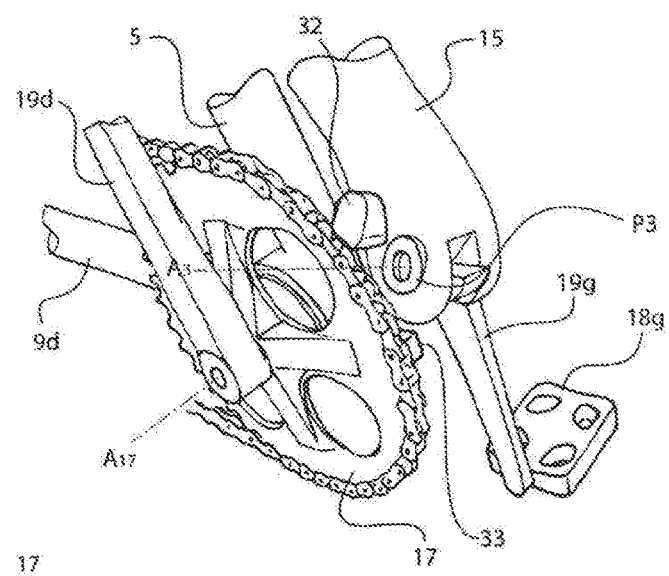

However, a system can be designed to minimize the risk of interference between a pedal, here the left pedal 18g, and another part of the bicycle during folding and unfolding operations. Thus, the bicycle may include a system for blocking the pedal in a particular position during the folding and unfolding operations. In particular, one of the pedals, here the left pedal 18g, can be maintained or locked in a low position (relative to the bicycle in the unfolded position), that is to say in a position in which the left crank arm is in a position 19g substantially vertical and oriented downwards, as illustrated in FIGS. 6A, 6B, 12A, 12B. Indeed, when the left crank arm 19g is oriented towards the front of the bicycle, rearward or upward, there may be, in certain configurations, a risk that the left pedal 18g interferes with the spokes or the rim of the front wheel 1. FIGS. 12A and 12B are perspective views of an example of a chain set locking system.

The locking system includes:
  a pin 32 fixed on the lower oblique rod 15, close to the plate 17; and
  a stop 33 fixed on the inner face of the plate 17.

The pin 32 extends in a direction substantially perpendicular to the median plane of the bicycle, without touching the plate 17. The stop 33 and the pin 32 are fixedly mounted on the plate 17 and the rod 15, respectively.

When folding the bicycle (FIG. 12B), the lower oblique rod 15 pivots about the axis A3 of the joint P3, and comes closer to the seat bar 5.

Figure 13:
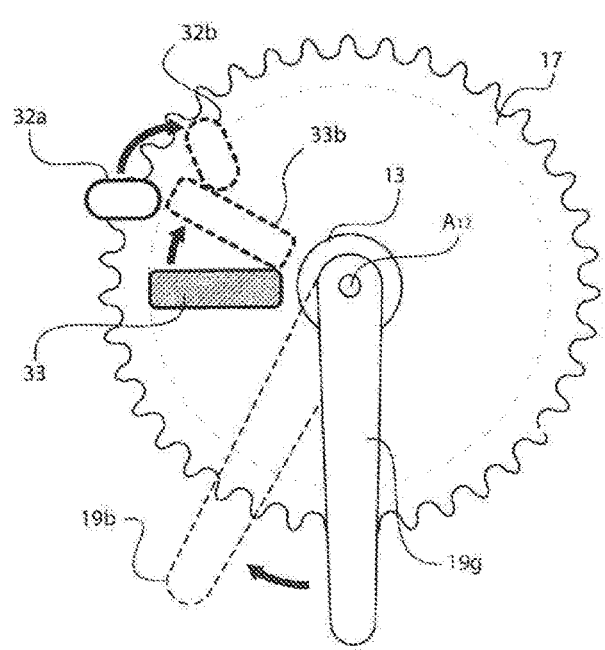
FIG. 13 shows diagrammatically, in side view, the chain set and the locking system of FIGS. 12A and 12B.

FIG. 13 diagrammatically illustrates the operation of this mechanism, in left side view.

In the unfolded position, that is to say when the bicycle is in use position, the pin 32 is in a position 32*a* which does not interfere with the travel of the stop 33. The chain set can thus freely rotate around its axis A17.

From the start of folding, when the lower oblique rod 15 pivots about the axis A3, the pin 32 approaches the axis A17, and cuts the travel of the stop 33. In other terms, when the plate rotates, the stop 33 comes against the pin 32 and is blocked in its movement. In the folded position, the pin 32 is in the position 32*b* shown in dashes in FIG. 13, and the chain set cannot rotate anymore beyond the position 33*b* of the stop 33 also shown in dashes. Rotation of the left crank arm 19*g* is thus limited to a small angular sector. At maximum, the crank arm 19*g* can reach the position 19*b* in dashes in FIG. 13.

Such a locking system prevents any interference of the pedal 18*g* with another part of the bicycle during folding and unfolding operations without preliminary manual intervention on the bicycle chain set and, in particular, without having to remove or fold the pedal 18*g* or the crank arm 19*g*. At most, it may be recommended to the user, prior to folding, to check that the pedal 18*g* is down, and if not, to turn it with his foot until a suitable position is reached.

To further reduce the size of the folded bicycle, one can provide additional systems for folding the seat 3 and the handlebars 6.

Figure 6D:
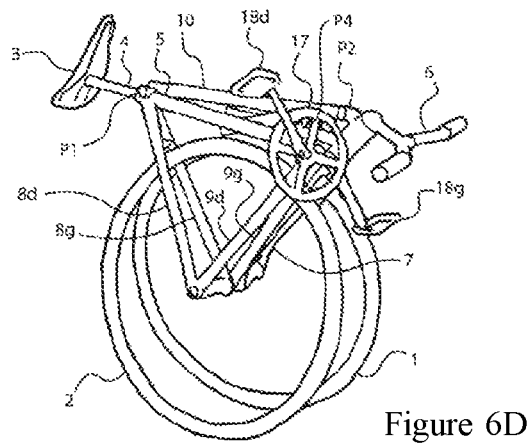
Figure 9A:
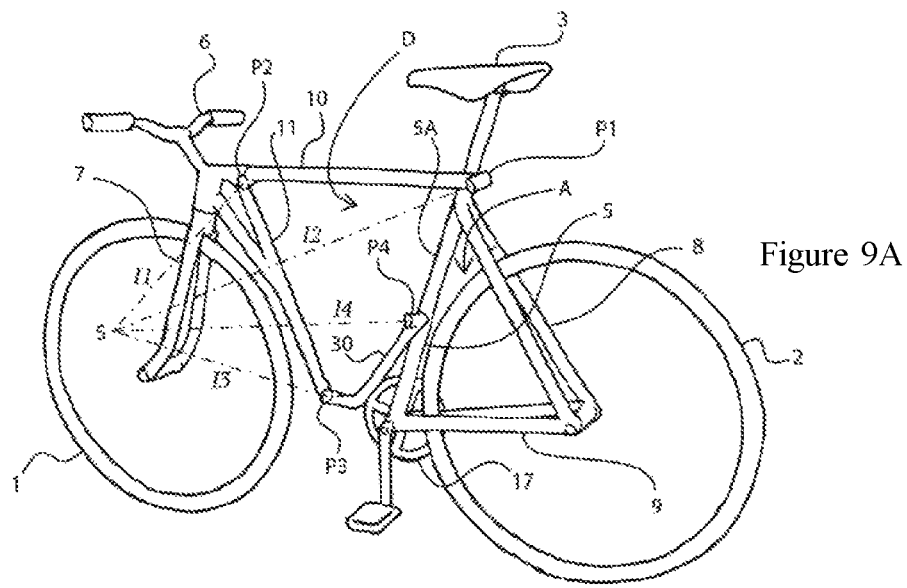
FIGS. 9A to 9D are perspective views of the folding sequence of a third example of a folding bicycle.
Figure 9B:
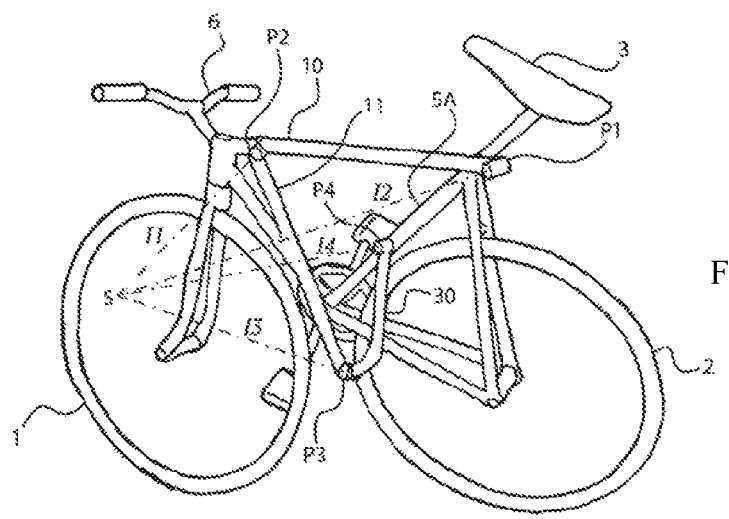
Figure 9C:
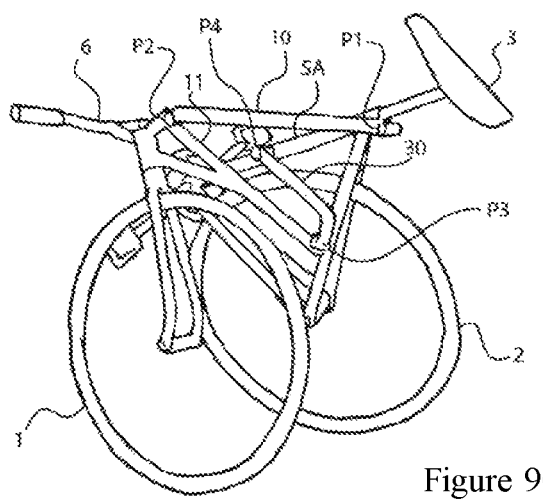
Figure 9D:
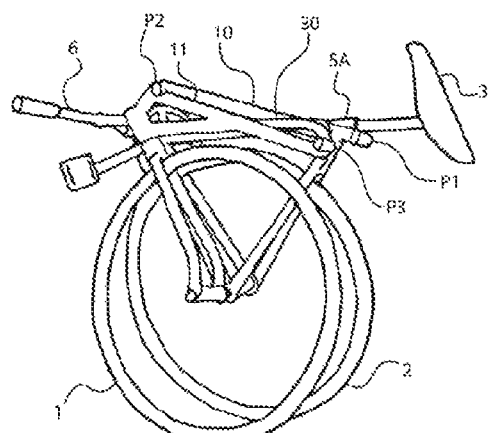

FIG. 7A shows a view of the right profile of the folded bicycle, in a configuration similar to that of FIGS. 4C and 6D.

The seat 3 is pivotally mounted on a seat holder 20 and pivots around a P5 joint formed by a revolute joint whose axis is perpendicular to the median plane of the bicycle.

The handlebars 6 also have a P6 joint whose axis 16 is oblique, to enable the handlebars 6 to swivel to the left side of the bicycle, in order not to be impeded by the plate 17.

In fully folded position (FIG. 7B), the handlebars 6 are folded in a plane substantially parallel to that of the front wheel 1. The seat 3 may in turn be positioned between the front 1 and back wheels 2, if necessary by turning the seat rod 4 inside the seat 5 bar. The seat 3 and the handlebars 6 are thus folded inside the volume delimited by the front and rear wheels 1, 2.

FIGS. 9A to 9D are perspective views of the folding sequence of a third example of a folding bicycle including a front wheel 1, a rear wheel 2 and a frame. The frame includes a front frame portion on which the front wheel 1 is mounted, by means of a pivoting fork 7, and a rear frame portion A on which the rear wheel 2 is mounted, The front frame portion A includes at least one seat stay 8, at least one lower bar 9 and a seat bar 5. The front frame portion includes an upper bar 10, an upper portion 5A of the seat bar 5, a connecting bar 30 and an oblique bar 11.

The upper portion 5A of the seat bar, the upper bar 10, the oblique rod 11 and the connecting bar 30 are interconnected between them in this order, by joints P1 to P4 so as to form an articulated quadrilateral D deformable between a folded position and an unfolded position. The articulated quadrilateral D is configured so that, by deforming towards its folded position, the bicycle can be folded in the lengthwise direction until the front wheel 1 comes to be superimposed on the rear wheel 2 in a transversal direction of the bicycle.

This example of bicycle therefore differs from that of the preceding figures in that its frame includes an additional structural element, namely, the connecting bar 30, and in that the oblique bar 11 is not formed by a lower oblique rod and an upper oblique rod articulated together. The joint P4 is instead provided on the seat 5 bar for connecting the upper portion 5A of the seat bar to the connecting bar 30. However, the explanations given for the previous examples, regarding the configuration of the joints and, more generally, of the articulated quadrilateral D still apply. These explanations are therefore not repeated here for the sake of brevity.

The examples or embodiments described in this paper are provided for illustration and not limitation, and a skilled person can easily, in view of the present disclosure, modify these examples or embodiments, or consider others while remaining within the scope of the invention.

Finally, the different features of the examples or embodiments described herein may be considered separately or combined together. When combined, these features can be combined as described above or differently, the invention not being limited to the specific combinations described above. In particular, unless stated otherwise or technically impossible, a feature described in relation to an example or embodiment may be applied analogously to another example or embodiment.

The invention claimed is:

1. A folding bicycle comprising
a front wheel, a rear wheel and a frame wherein,
the frame comprises a front frame portion on which the front wheel is mounted, via a pivoting fork, and a rear frame portion on which the rear wheel is mounted,
the front frame portion comprises an upper bar, a seat bar and an oblique bar,
the rear frame portion comprises at least one seat stay, at least one lower bar and the seat bar,
and wherein,
the oblique bar comprises an upper oblique rod and a lower oblique rod,
the lower oblique rod, the upper oblique rod, the upper bar and the seat bar are interconnected by joints, in this order, so as to form an articulated quadrilateral deformable between a folded position and an unfolded position,
the articulated quadrilateral is configured in such a way that, when deforming towards its folded position, the bicycle folds in the longitudinal direction, the front and rear wheels move transversely away from each other while moving towards each other in the longitudinal direction until the front wheel comes to overlap with the rear wheel in a transverse direction of the bicycle, and
the joints are revolute joints and axes of the revolute joints intersect at a same point.

2. The folding bicycle according to claim 1, wherein the rear frame portion is non-deformable.

3. The folding bicycle according to claim 1, comprising a locking system to lock the articulated quadrilateral in its unfolded position.

4. The folding bicycle according to claim 1, wherein the locking system is provided between the lower oblique rod and the upper oblique rod.

5. The folding bicycle according to claim 4, wherein the locking system comprises:
a bolt slidably mounted inside one of the oblique rods between an extended position and a retracted position;

a keeper fitted inside the other oblique rod and cooperating with the bolt in the extended position to prevent relative rotation of the oblique rods around the joint.

6. The folding bicycle according to claim 5, wherein one of the oblique rods has an extension extending axially beyond the joint, while the other rod has a cut-out whose shape is complementary to that of the extension, and wherein the bolt slides axially inside the extension.

7. The folding bicycle according to claim 6, comprising a latch movably mounted in said extension between a bolt locking position and a bolt release position, the latch being movable in translation laterally but not axially, wherein a protruding pin is provided facing the latch, on a side face of the cut-out, so that the protruding pin comes to bear on the latch to unlock the bolt when the oblique rods are unfolded to be aligned.

8. The folding bicycle according to claim 5, wherein the locking system comprises an unlocking lever mounted on the same oblique rod as the bolt and cooperating with the bolt for moving the latter towards its retracted position and thus allowing rotation of the oblique rods relative to each other.

9. The folding bicycle according to claim 1, comprising a bicycle chain set and a locking system to lock the bicycle chain set in a particular position when folding or unfolding the bicycle.

10. The folding bicycle according to claim 9, wherein the chain set comprises a pedal plate rotating about an axis and wherein the locking system comprises:
a pin fixed on the lower oblique rod near the pedal plate; and
a stop fixed on an inner face of the plate,
wherein the pin is positioned to, in the unfolded position, not interfere with the travel of the stop so that the plate can rotate freely about its axis and, when folded, when the lower oblique rod pivots relative to the seat bar and approaches it, the pin approaches the axis of the plate and cuts the travel of the stop so that the plate cannot rotate freely.

11. The folding bicycle according to claim 9, wherein the locking system is provided between the upper portion of the seat bar and the connecting bar.

12. The folding bicycle according to claim 1, wherein the axes of the revolute joints converge at a point which is located in a different plane and transversely away from a median plane of the folding bicycle.

13. A folding bicycle comprising
a front wheel, a rear wheel and a frame wherein,
the frame comprises a front frame portion on which the front wheel is mounted, via a pivoting fork, and a rear frame portion on which the rear wheel is mounted,
the rear frame portion comprises at least one seat stay, at least one lower bar and a seat bar, and wherein,
the front frame portion comprises an upper bar, an upper portion of the seat bar, a connecting bar and an oblique bar, and
the upper bar, the upper portion of the seat bar, the connecting bar and the oblique bar are interconnected by joints, in this order, so as to form an articulated quadrilateral deformable between a folded position and an unfolded position,
the deformable articulated quadrilateral is configured in such a way that, when deforming towards its folded position, the bicycle folds in the longitudinal direction, the front and rear wheels move transversely away from each other while moving towards each other in the longitudinal direction until the front wheel comes to overlap with the rear wheel in a transverse direction of the bicycle,
the joints are revolute joints and axes of the revolute joints intersect at a same point.

14. The folding bicycle according to claim 13, comprising a bicycle chain and a locking system to lock the bicycle chain set in a particular position when folding or unfolding the bicycle.

15. The folding bicycle according to claim 14, wherein the chain set comprises a pedal plate rotating about an axis and wherein the locking system comprises:
a pin fixed on the lower oblique rod near the pedal plate; and
a stop fixed on an inner face of the plate,
wherein the pin is positioned to, in the unfolded position, not interfere with the travel of the stop so that the plate can rotate freely about its axis and, when folded, when the lower oblique rod pivots relative to the seat bar and approaches it, the pin approaches the axis of the plate and cuts the travel of the stop so that the plate cannot rotate freely.

16. The folding bicycle according to claim 13, wherein the rear frame portion is non-deformable.

17. The folding bicycle according to claim 13, wherein the axes of the revolute joints converge at a point which is located in a different plane and transversely away from the median plane of the bicycle.

18. The folding bicycle according to claim 13, comprising a locking system to lock the articulated quadrilateral in its unfolded position.

* * * * *